Dec. 5, 1933.  H. F. HUFF  1,937,958

APPARATUS FOR FRACTIONAL DISTILLATION

Filed Sept. 15, 1930

INVENTOR
HUGO F. HUFF
BY Frank L. Belknap
ATTORNEY

Patented Dec. 5, 1933

1,937,958

UNITED STATES PATENT OFFICE 1,937,958

APPARATUS FOR FRACTIONAL DISTILLATION

Hugo F. Huff, Chicago, Ill., assignor to Universal Oil Products Company, Chicago, Ill., a corporation of South Dakota Application September 15, 1930
Serial No. 481,883

6 Claims. (Cl. 261—114)

This invention relates to an improved means for fractional distillation which is particularly adaptable to the fractionation of complex mixtures of compounds such as hydrocarbon oils but may also be used in fractionation of materials of a more simple structure such as alcohol, benzol, toluol, or the like. The apparatus of the invention also is adaptable to use as an absorption or scrubbing tower for the treatment of natural gases, cracked gases and the like, or to any similar process where intimate contact between liquid and vapor is desired.

The attached diagrammatic drawing will serve to more clearly illustrate the advantageous features and novelty of the invention.

Figure 3:
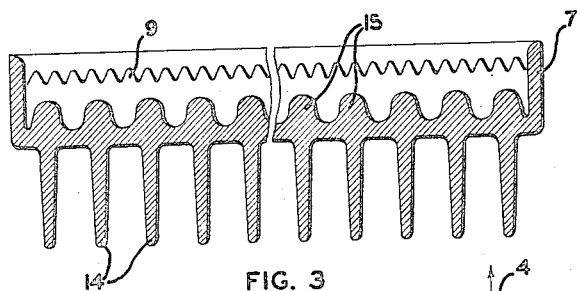
Fig. 3 is an enlarged detailed sectional view of one of the pans or trays of the fractionating device taken along the line 3—3 of Fig. 1.

Referring now to the drawing, vapors to be fractionated may be introduced into tower or column 1 through vapor inlet 2 in the outer wall or shell 3 of the column. Fractionated vapors may be removed through vapor outlet 4 which, in this case may be disposed in the removable top head 5 of the column. The heavier components of the vapors introduced through inlet 2 which may be separated from the lighter portion of these vapors leaving through outlet 4 by fractionation in column 1 may be condensed therein and withdrawn from the column through the bottom outlet 6. This material may be continuously or intermittently withdrawn but preferably a level of condensate is at all times maintained in the lower portion of the column at any desired point below inlet 2 to prevent the escape of vapors through outlet 6 and also to maintain this condensate in the fractionating zone for a period of time during which it may be subjected to a reboiling action by any well known means to affect the final separation of any desirable light constituents which may be entrained therein.

The vapors to be fractionated pass upwardly through column 1 traveling from side to side of the column in a path generally indicated by the arrows, coming in intimate contact with their own heavier condensed portions as well as with liquid introduced into the column, as will be hereinafter more fully described, to assist fractionation and condensation of the vapors and to maintain the desired outlet temperature and assist in controlling the quality of the finished product leaving through outlet 4.

In the present invention intimate contact between liquid and vapors is established by passing the vapors between successive series of pans or trays arranged in a staggered formation from side to side of the column from each of which trays liquid is continuously falling through perforations in the bottom thereof to the next lower tray and from side to side of the column concurrent to the lateral flow of the vapors and countercurrent to their upward flow.

Figure 2:
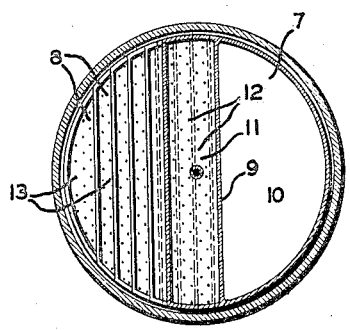
Fig. 2 is a sectional plan view of the same apparatus taken along line 2—2 in Fig. 1.
Figure 1:
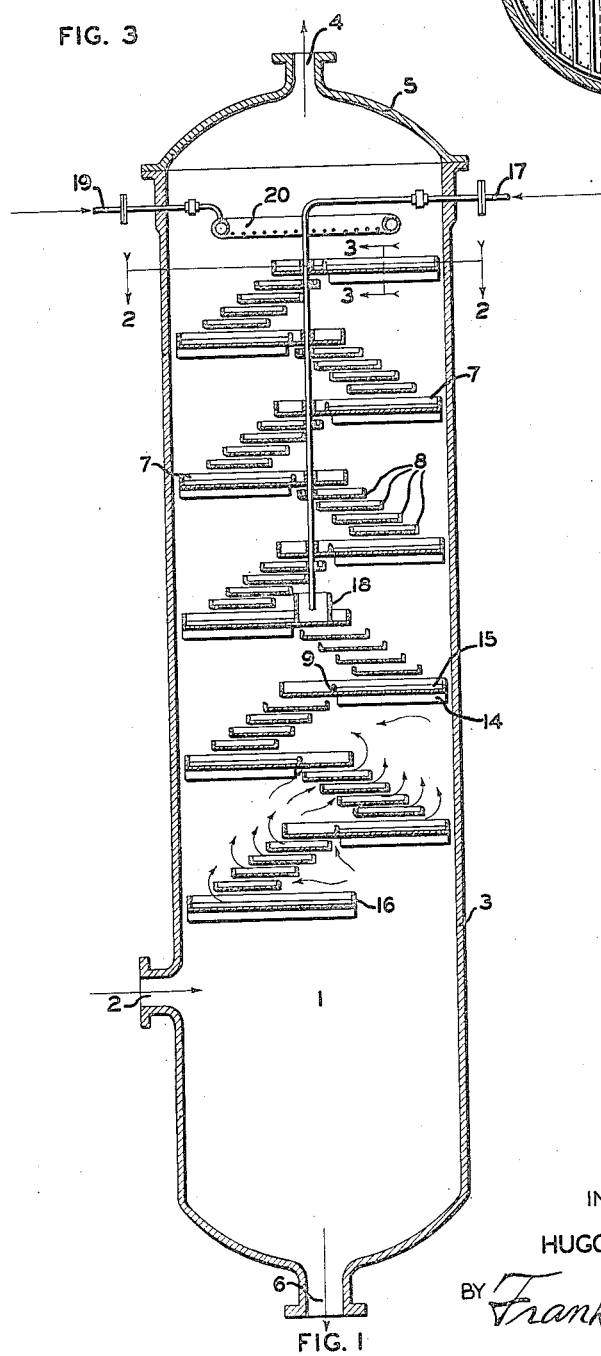
Fig. 1 is a sectional side elevation of one form of apparatus suitable for carrying out my invention.

Accumulator trays 7, substantially semi-circular in shape, as clearly indicated in Fig. 2, may be spaced at uniform or graduated intervals throughout any desired portion or all of column 1. Alternate trays 7 face in diametrically opposite directions as shown in Fig. 1 and between these alternate accumulator trays distributing trays 8 are spaced at uniform or graduated intervals. Partitions 9 upon trays 7 permit the accumulation of a small reservoir of liquid upon each of these trays. The liquid in the case illustrated, accumulates in the reservoir 10 upon that portion of the trays 7 adjacent the shell 3 of the column and flows over the partition 9 onto the perforated distributing portion 11 of trays 7 from which it falls through perforations 12 to the series of trays 8 and thence from tray to tray of the series 8 through perforations 13 in the bottom of each of these trays, which are arranged in steps as shown so that the liquid from the last of each series of trays 8 finally falls into the reservoir 10 of the succeeding trays 7. It will thus be seen that the imperforate portion of the enlarged tray 7 not only serves to receive and retain a portion of the descending liquid and diverts the same upon overflow from such tray onto the next succeeding group of perforated trays disposed immediately below the enlarged tray, but also functions as a baffling or guiding means for diverting ascending vapors passing through the fractionating device into and between each of the groups of perforated trays 8 disposed immediately above such enlarged trays 7, thereby promoting intimate contact of such vapors with the downwardly descending liquid.

Reservoirs 10, upon trays 7, are provided with heat absorbing fins 14 which extend into the vapor space within column 1 and with radiating surfaces 15 extending into the liquid in reservoir 10 which assist in heating the liquid and revaporizing its lighter constituents. The upper edge of partition 9 over which liquid flows from reservoir 10 to the distributing portion 11 of trays 7, may be provided with serrations as indicated in Fig. 3 which insure more uniform distribution of liquid to the perforations 12. Tray 16, which is the first tray above inlet 2, preferably has no partition 9 but may be provided with perforations in its entire bottom and may have fins 14 distributed over the entire under surface and fins 15 distributed over the entire inner surface of its bottom side.

Line 17 provides means for introducing a cooling liquid into the fractionating device, which liquid is preferably of heavier specific gravity than the vapors entering column 1 through inlet 2. This cooling liquid may preferably be introduced to the tray 7 located, if desired, in an intermediate position in the fractionating column as indicated in Fig. 1 and may discharge into a cup or similar receptacle 18 overflowing therefrom onto tray 7. Another cooling medium lighter in specific gravity than the vapors entering the fractionating column and preferably similar in characteristics to the desired finished product from the fractionating column may be introduced through line 19 and, as here illustrated, may be sprayed into the upper portion of the fractionating column above the trays through a perforated coil 20. The cooling material introduced through line 17 may, if desired, be raw material or charging stock for the system of which the fractionating device may be a part. The cooling medium introduced through line 19 and spray 20 may be a portion of the finished product from the fractionating device after it has been condensed and cooled or may be any other relatively cool extraneous material which will not contaminate the finished product.

The apparatus of the present invention may be operated under any desired pressure ranging from subatmospheric to high superatmospheric pressures of several thousand pounds per square inch. The temperatures employed will depend entirely upon the type of process with which the fractionating device is used, the materials being treated and the desired products.

It will be understood that the invention is not to be limited to the production of only one fractionated material as side streams may be drawn from the column by well known means, not shown, at any desired point, likewise more than one stream of reflux condensate of varying characteristics may be withdrawn from the column by removing liquid to any of the trays by well known means, not illustrated.

As a specific example of the operation of this improved method of fractionation, which is given only for the purpose of illustration and should not be construed as a limitation upon the invention, cracked hydrocarbon vapors of about 32° A. P. I. gravity are introduced into the column for fractionation. A major portion of the charging stock of the cracking system is introduced through line 17, to the central portion of the fractionating device to assist cooling, particularly in that portion of the column below its point of entrance. A portion of the condensed finished product is recirculated through line 19 and spray 20, to the upper portion of the column to assist cooling therein and to maintain the fractionated vapors leaving the column at a temperature of about 550° F. The gravity of the fractionated vapors is about 52° A. P. I. and they contain about 80% of material falling within the boiling range of motor fuel. The raw oil charging stock introduced to the fractionating column in this case, contains substantially no material falling within the range of motor fuel and is withdrawn from the lower portion of the fractionating column together with reflux condensate and fed to the heating element of the cracking system for conversion.

In an operation of this nature with my improved method and means of fractionating the entrainment of gasoline-like constituents in the reflux condensate may be reduced from some 4 to 6%, as obtained in ordinary fractionating methods operated under similar conditions, approximately 2 to 3%, or a reduction of substantially 50%.

I claim as my invention:

1. A fractionating column comprising in combination, a receptacle having one inlet for vapors and outlets for vapors and liquid, a plurality of groups of perforated trays disposed within said receptacle, the trays comprising each group being disposed stepwise with respect to each other, the axis of trays comprising alternate groups being parallel and the trays of alternate groups being arranged stepwise in opposite directions, and an enlarged baffle tray interposed between each of said plurality of groups for directing vapors therethrough.

2. In combination, a receptacle, a plurality of groups of perforated stepwise arranged trays disposed in said receptacle, alternate groups of perforated trays being disposed stepwise in opposite directions, an enlarged master tray disposed between each of said groups of perforated trays, means for introducing vapors into said receptacle and passing the same upwardly adjacent said groups of perforated trays, means for introducing cooling liquid into said receptacle and passing the same downwardly through said groups of perforated trays.

3. In combination, a receptacle, a plurality of groups of perforated stepwise arranged trays disposed in said receptacle, alternate groups of perforated trays being disposed stepwise in opposite directions, an enlarged master tray having a perforated edge portion interposed between each of said groups of perforated trays adapted to divert vapors through said groups, means for introducing vapors into said receptacle and passing the same between adjacent perforated trays of each group, means for introducing cooling liquid into said receptacle and passing the same downwardly through said groups of perforated trays.

4. In combination, a receptacle, a plurality of groups of perforated trays disposed in said receptacle, alternate groups of perforated trays being disposed one above the other, an enlarged master tray having a perforated edge portion interposed between each of said groups of perforated trays adapted to divert vapors through said groups, means for introducing vapors into said receptacle and passing the same first in one direction and then in the opposite direction between the perforated trays of the groups, means for introducing cooling liquid into said receptacle and passing the same downwardly through said groups of perforated trays and at substantially right angles to the vapors passing adjacent said trays.

5. In combination, a receptacle, a plurality of groups of perforated stepwise arranged trays disposed in said receptacle, alternate groups of perforated trays being disposed stepwise in opposite directions, an enlarged vapor and liquid diverting master tray associated with each group of trays, means for introducing vapors into said receptacle and passing the same between adjacent perforated trays of each group, means for introducing cooling liquid into said receptacle and passing the same downwardly through said groups of perforated trays, each group of trays emptying into one of said master trays and each of said master trays emptying into the next adjacent group of perforated trays.

6. A fractionating column comprising in combination, a receptacle, means for introducing vapors into said receptacle for passage upwardly therethrough, means for introducing a cooling medium for said vapors into said receptacle for passage downwardly therethrough, vapor and liquid outlets from said receptacle, a plurality of alternately disposed and stepwisely arranged groups of perforated trays mounted within said receptacle, and an enlarged partially perforated baffle tray associated with each of said perforated tray groups adapted to divert liquid over and vapors between each of the trays of said groups.

HUGO F. HUFF.